United States Patent [19]

Scott-Scott

[11] Patent Number: 5,085,037
[45] Date of Patent: Feb. 4, 1992

[54] MINIMIZING THE EFFECTS OF ICING IN THE INTAKES OF AEROSPACE PROPULSORS

[75] Inventor: John L. Scott-Scott, Warwick, England

[73] Assignee: Rolls-Royce plc, Derby, England

[21] Appl. No.: 314,702

[22] Filed: Feb. 17, 1989

[30] Foreign Application Priority Data
Mar. 23, 1988 [GB] United Kingdom ............... 8806890

[51] Int. Cl.$^5$ .............................................. F02K 9/44
[52] U.S. Cl. .................................. 60/39.093; 165/51; 165/101; 165/17; 60/266
[58] Field of Search ............ 60/246, 267, 266, 270.1, 60/39.029, 39.093, 204, 244; 165/101, 51, 17

[56] References Cited
U.S. PATENT DOCUMENTS
3,775,977 12/1973 Builder et al. ...................... 60/267
4,201,044 5/1980 Dodd ............................ 60/39.093

FOREIGN PATENT DOCUMENTS
61-61951 8/1986 Japan.

Primary Examiner—Michael J. Carone
Attorney, Agent, or Firm—Cushman, Darby & Cushman

[57] ABSTRACT

An air intake suitable for an aerospace propulsor comprises a duct in which are provided two pirmary heat exchangers arranged in parallel relationship and a secondary heat exchanger downstream of the primary heat exchangers. The primary and secondary heat exchangers are arranged to place a cryogenic fluid in heat exchange relationship with the air flow through the duct. Icing of the primary heat exchangers is controlled by interrupting the flow of cryogenic fluid to each of the primary heat exchanger in turn. Thus while one heat exchanger is subject to ice accretion hereon, the temperature of the other increases sufficiently for de-icing thereof to occur.

8 Claims, 1 Drawing Sheet

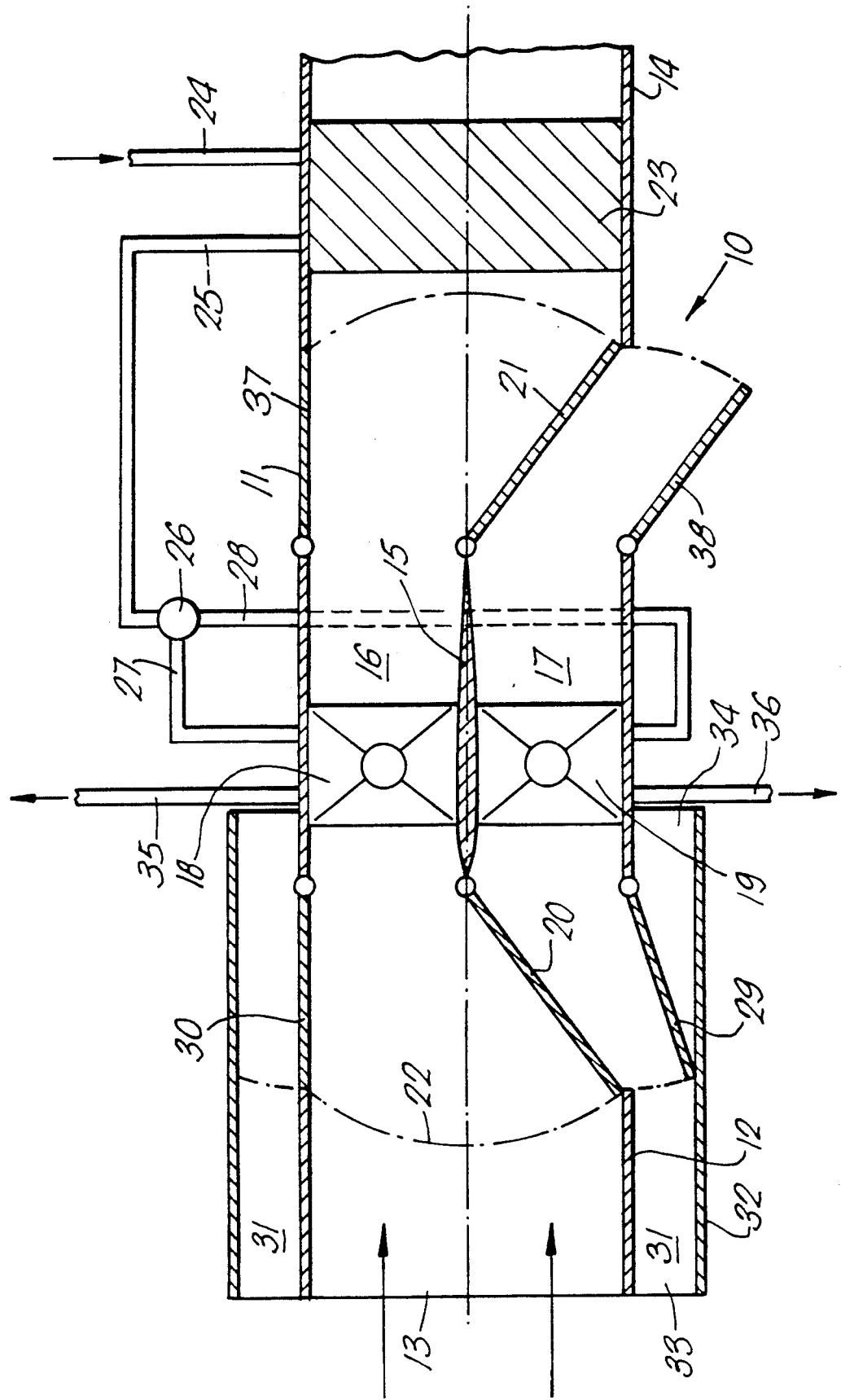

MINIMIZING THE EFFECTS OF ICING IN THE INTAKES OF AEROSPACE PROPULSORS

This invention relates to minimizing the effects of icing in the intakes of aerospace propulsors and has particular reference to intakes suitable for use with the type of aerospace propulsor disclosed in UK patent application number 8430157.

Certain aerospace propulsors, for instance those of the general type described in UK patent application 8430157, rely for their effective operation on the provision of one or more heat exchangers in their intakes. The heat exchangers are adapted to place liquid hydrogen, which is used as a propulsor fuel, in heat exchange relationship with the air which operationally flows through the duct.

It is inevitable that ambient air entering the aerospace propulsor intake will contain water vapour. This water vapour is subjected to a rapid reduction in temperature within the heat exchangers so that it freezes and causes ice accretion upon the matrices of the heat exchangers. If ice accretion is allowed to continue, a point is rapidly reached at which insufficient air can pass through the heat exchanger matrices to satisfy the air demands of the propulsor.

It is an object of the present invention to provide an air intake suitable for an aerospace propulsor in which the effects of icing are minimized.

According to the present invention, an air intake suitable for directing an air flow to an aerospace propulsor includes two or more heat exchangers arranged in parallel relationship so as to place substantially all of said air flow so directed in heat exchange relationship with a cryogenic fluid, air flow directing means and cryogenic fluid flow directing means being associated with said heat exchangers, said air flow directing means being so arranged as to provide that each of said heat exchangers is alternately exposed to the air flow directed to said propulsor and an air flow which is not directed to said propulsor in such a manner that said propulsor is provided with a continuous air flow which has been placed in heat exchange relationship with said cryogenic fluid, said cryogenic fluid directing means being so arranged that said cryogenic fluid only flows through a heat exchanger when that heat exchanger is exposed to said air flow which is directed to said propulsor.

The invention will now be described, by way of example, with reference to the accompanying drawing which is a schematic sectioned side view of an air intake in accordance with the present invention.

With reference to the drawing an air intake generally indicated at 10 is suitable for use with an aerospace propulsor of the type described in UK patent application no. 8430157. The intake 10 comprises a duct 11 having an upstream end 12 at which is located an air inlet 13, and a downstream end 14 which delivers the air flow through the intake to an aerospace propulsor (not shown).

Approximately mid-way along the duct 11 there is located a splitter 15 which serves to divide the mid-portion of the duct 11 into two passages 16 and 17 of equal cross-sectional area. The passages 16 and 17 contain, in parallel, first and second primary heat exchangers 18 and 19 respectively which are, in operation, adapted to be supplied with liquid hydrogen and place that liquid hydrogen in heat exchange relationship with air passing through the duct 11.

The duct 11 and the centre body 15 are provided with a plurality of flaps which serve to control the air flow through the duct 11. More specifically, the centre body 15 has a first flap 20 pivotally attached to its upstream end. The flap 20 is sufficiently long to provide partial blockage of the duct 11 so that ambient air entering the duct 11 through the air inlet 13 passes through one of the primary heat exchangers 18 and 19 but not the other. Thus in the drawing the flap 20 is shown in the position in which ambient air flows through the first primary heat exchanger 18. If the flap 20 is pivoted about the arc indicated by the interrupted lines 22 then of course the ambient air flow to the first heat exchanger 18 will be blocked and the flow diverted through the second primary heat exchanger 19.

The ambient air flow, after it has passed through the first primary heat exchanger 18, then continues flowing through the duct 11, through a secondary heat exchanger 23 where it is again placed in heat exchange relationship with liquid hydrogen, before being directed into the air inlet of the aerospace propulsor (not shown).

The secondary heat exchanger 23 is fed with liquid hydrogen through an inlet pipe 24. The liquid hydrogen, after it has been placed in heat exchange relationship with the air flow through the duct 11, is exhausted from the secondary heat exchanger 23 through an outlet pipe 25. The outlet pipe 25 then directs the liquid hydrogen to a valve 26 which serves to direct the liquid hydrogen either to the first primary heat exchanger 18 via a pipe 27 or the second primary heat exchanger 19 via a pipe 28.

The valve 26 is so controlled (by means not shown) that liquid hydrogen exhausted from the secondary heat exchanger 23 only flows through the first or second primary heat exchanger 18 and 19 which is exposed, by virtue of the position of the flap 20, to the ambient air flow which has entered the duct 11 through the air inlet 13. Liquid hydrogen is exhausted from the first and second primary heat exchangers 18 and 19 through pipes 35 and 36 respectively.

The duct 11 is provided with two flaps 29 and 30 in its wall adjacent the centre body flap 20. The flaps 29 and 30, when open, provide a communication between the interior of the duct 11 and a radially outer passage 31 defined between the upstream end 12 of the duct 11 and a cowling member 32. The outer passage 31 has an inlet 33 which is coplanar with the duct inlet 13 and an outlet 34 which is located in the region of the first and second primary heat exchangers.

The flaps 29 and are so controlled that when the ambient air flow from the air inlet 13 is directed by the flap 20 to pass through one of the primary heat exchangers 18 and 19, the relevant one the flaps 29 and 30 is opened to permit an air flow from the outer passage 31 through the other of the primary heat exchangers 18 and 19. In the situation depicted in the drawing therefore, the flap 30 is closed and the flap 29 open so that there is as stated earlier, a flow of air from the inlet 13 through the first primary heat exchanger 18, and a flow of air from the inlet 33 (and the passage 31) through the second primary heat exchanger 19.

In order to ensure that air which has been derived from the outer passage 31 does not flow through the secondary heat exchanger 23 and into the aerospace propulsor, a second series of flow directing flaps is provided downstream of the centre body 15. More specifically, a single flap 21 is provided on the downstream end of the centre body 15, and two further flaps 37 and 38 are provided in the wall of the duct 11 adjacent the downstream centre body flap 21. The flaps 21,37 and 38 are so controlled that the air flow which has been derived from the inlet 13 of the duct 11 passes through the secondary heat exchanger 23 whereas the air flow which has been derived from the annular passage 31 is exhausted from the duct 11. Again referring to the situation shown in the drawing, the duct flap 37 is closed to permit the air exhausted from the first primary heat exchanger 18 (derived from the inlet 13) to pass through the secondary heat exchanger. The duct flap 38 is however open and the downstream centre body flap 21 so positioned as to ensure that air exhausted from the second primary heat exchanger 19 (derived from the passage 31) is exhausted in turn from the duct 11.

When the various flaps 20,21,29,30,37 and 38 are in the positions shown in the drawing and the valve 26 so positioned that liquid hydrogen exhausted from the secondary heat exchanger 23 passes through the first primary heat exchanger 18, the total air supply for the aerospace propulsor will, of course pass through the first primary heat exchanger 18. The air supply will contain water vapour and the low temperatures within the first primary heat exchanger ensure that virtually all of that water vapour condenses within the first primary heat exchanger 18 and freezes. There is therefore progressive ice accretion within the heat exchanger 18 which will in turn eventually lead to its blockage. However before total blockage is reached (as determined by a suitable detector) all of the flaps 20,21,29,30,38 and 39 are pivoted through the arcs indicated in interrupted lines in the drawing. In addition, the valve 26 is switched so that liquid hydrogen is directed to the second primary heat exchanger 19 instead of the first primary heat exchanger 18. The air flow to the secondary heat exchanger 23 and thence the aerospace propulsor is then directed through the second primary heat exchanger 19 which does not, since liquid hydrogen has not been flowing through it, have ice accretion within it. In the meantime, air which has been derived from the passage 31, is directed to first primary heat exchanger 19 and then exhausted from the duct 11. Since the flow of liquid hydrogen to the first primary heat exchanger 18 has by now been stopped by the valve 26, the air flow through the first primary heat exchanger 18 provides a rapid increase in the temperature within the heat exchanger 18. This in turn results in rapid melting of the ice within the heat exchanger 18 and the resultant water is, by virtue of the flap 37 being open, exhausted from the duct 11 and so does not enter the secondary heat exchanger 23.

While the ice is being melted within the first primary heat exchanger 18, there is, of course, ice accretion occurring within the second primary heat exchanger 19. When that ice accretion reaches a critical level with regard to the air flow rate through the second primary heat exchanger 19, the flaps 20,21,29,30,37 and 38 together with the valve 26 are actuated yet again and the process of ice melting and ice accretion is repeated. The cycle is repeated continuously so that there is a continuous supply of air to the aerospace propulsor which has passed through, and has been cooled by, either the first or the second primary heat exchanger 18 and 19, and the secondary heat exchanger 23.

The first and second primary heat exchangers 18 and 19 serve to condense and freeze substantially all of the water vapour in the air which ultimately passes through the secondary heat exchanger 23 and into the aerospace propulsor. Thus the air flow which reaches and passes through the secondary heat exchanger 23 is dry and therefore obviates any likelihood of significant ice accretion occurring within the secondary heat exchanger 23.

The propulsor described and claimed in UK Patent Application number 8430157 includes a low pressure compressor which receives air via two heat exchangers arranged in series. Both heat exchangers receive coolant in the form of high pressure liquid hydrogen.

The coolant flows are used to cool the low pressure compressor inlet air to a temperature which is appropriate for the efficient operation of the propulsor. In the case of the application of the present invention to such a propulsor, the first and second primary heat exchangers 18 and 19 alternately constitute the first of the heat exchangers of the propulsor and the secondary heat exchanger 23 constitutes the second propulsor heat exchanger.

Although the first and second primary heat exchangers 18 and 19 have been described as being supplied with liquid hydrogen exhausted from the secondary heat exchanger 23 it will be appreciated that they could have their own independent liquid hydrogen supply if so desired.

Almost all intakes for high speed propulsors require some form of air bleed in order to provide air flow stabilisation. In the case of the present invention, this air bleed is provided by the outer passage 31, which, of course, also constitute the source of ambient air for de-icing the first and second primary heat exchangers 18 and 19. It will be appreciated however that the air for de-icing the heat exchangers 18 and 19 need not necessarily be taken from the annular passage 31 but could be taken from a another convenient source of ambient air.

Although the present invention has been described with reference to two primary heat exchangers 18 and 19 arranged in parallel and upstream of unit 23, more could be utilised if so desired.

The danger of heat exchanger icing is at its greatest at ground level and low altitudes when the water vapour content of the air is likely to be high. At higher altitudes, the water vapour content may be sufficiently low as not to constitute a problem in the effective operation of the primary and secondary heat exchangers 18,19 and 23. In such circumstances, the flaps 20 and 21 may be placed in a mid-way position in so that the air flow from the duct air inlet 13 flows through both of the primary heat exchangers 18 and 19 simultaneously. In such circumstances the duct flaps 29,30,37 and 38 are maintained in their closed positions.

Although the present invention has been described with reference to liquid hydrogen being the cryogenic fluid directed through the heat exchangers 18,19 and 23, it will be appreciated that other cryogenic fluids, such as liquid methane could be used if so desired.

We claim:

1. An air intake suitable for directing an air flow to an aerospace propulsor including two or more heat exchangers arranged in parallel relationship so as to place substantially all of said air flow so directed in heat exchange relationship with a cryogenic fluid, air flow directing means and cryogenic fluid directing means being associated with said heat exchangers, said air flow directing means being so arranged as to provide that each of said heat exchangers is alternately exposed to the air flow directed to said propulsor and an air flow which is not directed to said propulsor, in such a manner that said propulsor is provided with a continuous air flow which has been placed in heat exchange relationship with said cryogenic fluid, said cryogenic fluid directing means being so arranged that said cryogenic fluid only flows through a heat exchanger when that heat exchanger is exposed to said air flow which is directed to said propulsor.

2. An air intake as claimed in claim 1 wherein said intake comprises a duct having an upstream end for receiving an air flow and a downstream end for delivery said air flow to said propulsor, said two or more heat exchangers being located within said duct.

3. An air intake as claimed in claim 2 wherein a further heat exchanger is provided in said duct downstream of said two or more heat exchangers arranged in parallel relationship, said further heat exchanger being continuously exposed to said air flow directed to said propulsor and adapted to place said air flow in heat exchange relationship with a cryogenic fluid.

4. An air intake as claimed in claim 2 wherein said air flow directing means comprises a plurality of pivoted flaps.

5. An air intake as claimed in claim 4 wherein at least some of said pivoted flaps are located in the wall of said duct, said flaps being so arranged as to permit said air flow not directed to said propulsor to be taken from a position other than at said upstream end of said duct, direct that air flow through a heat exchanger and subsequently exhaust said air flow from a position other than at said downstream end of said duct.

6. An air intake as claimed in claim 5 wherein said duct is provided with a bleed passage adapted to provide air flow stabilisation in said intake, said air flow not directed to said propulsor being taken from said bleed passage.

7. An air intake as claimed in claim 2 wherein the cryogenic fluid passed through said further heat exchanger is subsequently passed through said heat exchangers in parallel relationship so that the air flow to said propulsor is twice placed in heat exchange relationship with said cryogenic fluid.

8. An air intake as claimed in any claim 1 wherein said cryogenic fluid is liquid hydrogen.

* * * * *